US009571272B2

(12) United States Patent
Sato

(10) Patent No.: US 9,571,272 B2
(45) Date of Patent: Feb. 14, 2017

(54) IMAGE FORMING APPARATUS, INFORMATION PROCESSING METHOD, AND CONTROL METHOD

(71) Applicant: CANON KABUSHIKI KAISHA, Tokyo (JP)

(72) Inventor: Masaaki Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 345 days.

(21) Appl. No.: 14/056,142

(22) Filed: Oct. 17, 2013

(65) Prior Publication Data

US 2014/0122877 A1 May 1, 2014

(30) Foreign Application Priority Data

Oct. 26, 2012 (JP) ................................ 2012-236954

(51) Int. Cl.
*H04L 9/08* (2006.01)
*G06F 21/44* (2013.01)
*G06F 9/445* (2006.01)

(52) U.S. Cl.
CPC ............... *H04L 9/0822* (2013.01); *G06F 8/61* (2013.01); *G06F 21/44* (2013.01); *H04L 9/088* (2013.01); *H04L 9/0894* (2013.01)

(58) Field of Classification Search
CPC ...... G06F 21/12; G06F 21/121; G06F 21/305; G06F 21/6209; G06F 21/44; G06F 8/61; H04L 9/0822; H04L 9/088
USPC .......................................................... 713/1, 2
See application file for complete search history.

(56) References Cited

U.S. PATENT DOCUMENTS 8,578,362 B2 * 11/2013 Brescia ..................... G06F 8/65 713/2
2004/0117664 A1 * 6/2004 Colvin .................. G06F 21/121 726/30
2005/0005137 A1 * 1/2005 Benedikt ................ G06F 21/10 713/189
2005/0076096 A1 * 4/2005 Nishibe ................... G06F 21/10 709/218
2007/0041584 A1 * 2/2007 O'Connor ............. G06F 21/121 380/45

(Continued)

FOREIGN PATENT DOCUMENTS

JP 2009-193275 A 8/2009
JP 2009-230198 A 10/2009
JP 2010-176446 A 8/2010

*Primary Examiner* — Tae Kim
(74) *Attorney, Agent, or Firm* — Canon U.S.A., Inc. IP Division

(57) ABSTRACT

An image forming apparatus using a service of a server apparatus decrypts encrypted common authentication information of the image forming apparatus based on secret key information for decrypting the common authentication information, and then requests encrypted individual authentication information of the image forming apparatus from the server apparatus based on decrypted common authentication information and identification information for identifying the image forming apparatus. The image forming apparatus obtains the individual authentication information from the server apparatus, requests the server apparatus for use permission information of the service based on the decrypted individual authentication information and on service use information, and obtains the use permission information from the server apparatus.

15 Claims, 18 Drawing Sheets

START
S1300 HAS INDIVIDUAL UNIQUE KEY BEEN OBTAINED? — YES / NO
S1301 OBTAIN SECRET KEY FOR DECRYPTING INITIAL COMMON KEY
S1302 OBTAIN ENCRYPTED INITIAL COMMON KEY
S1303 DECRYPT INITIAL COMMON KEY
S1304 STORE DECRYPTED INITIAL COMMON KEY IN RAM 308
S1305 OBTAIN INDIVIDUAL IDENTIFICATION INFORMATION
S1306 STORE OBTAINED INDIVIDUAL IDENTIFICATION INFORMATION IN RAM 308
S1307 CALL INDIVIDUAL UNIQUE KEY ISSUE PROCESSING BY USING AS ARGUMENTS DECRYPTED INITIAL COMMON KEY AND INDIVIDUAL IDENTIFICATION INFORMATION OBTAINED FROM RAM 308
S1308 TRANSFER OBTAINED INDIVIDUAL UNIQUE KEY TO INDIVIDUAL UNIQUE KEY MANAGEMENT UNIT, AND TRANSFER SECRET KEY TO SECRET KEY MANAGEMENT UNIT
S1309 DELETE ENCRYPTED INITIAL COMMON KEY
END

(56) References Cited

U.S. PATENT DOCUMENTS

2012/0131349 A1* 5/2012 Layson ................. G06F 21/121 713/182
2012/0151574 A1* 6/2012 Zhang .................. G06F 21/121 726/19
2012/0240107 A1* 9/2012 Brescia ............... G06F 11/1433 717/168

* cited by examiner

| USE | SECRET KEY INFORMATION |
|---|---|
| FOR INITIAL COMMON KEY | xxx-yyy-zzz |
| FOR INDIVIDUAL UNIQUE KEY | vvv-www-aaa |

FIG.7

| INDIVIDUAL UNIQUE KEY (701) | APPLICATION IDENTIFICATION INFORMATION (702) | APPLICATION INPUT INFORMATION (703) | OPERATION PERMIT (704) |
| --- | --- | --- | --- |
| DC-1001 (705) | Appl-0002 (706) | USER-AA (707) | AT-00A (708) |

| INDIVIDUAL IDENTIFICATION INFORMATION | INDIVIDUAL NAME |
| --- | --- |
| 1001 | INDIVIDUAL xxx-yyy |

FIG.9

| APPLICATION IDENTIFICATION INFORMATION | APPLICATION NAME | INITIAL COMMON KEY |
|---|---|---|
| Appl-0001 | ACCESS TOKEN OBTAINING APPLICATION | INCLUDED |
| Appl-0002 | PRINTING APPLICATION | NOT INCLUDED |

| INDIVIDUAL IDENTIFICATION INFORMATION | INDIVIDUAL UNIQUE KEY | STATUS |
| --- | --- | --- |
| 1001 | DC-1001 | ISSUED |

FIG.11

| INDIVIDUAL UNIQUE KEY (1101) | APPLICATION IDENTIFICATION INFORMATION (1102) | APPLICATION INPUT INFORMATION (1103) | OPERATION PERMIT (1104) | STATUS (1105) |
|---|---|---|---|---|
| DC-1001 (1106) | Appl-0002 (1107) | USER-AA (1108) | AT-00A (1109) | ISSUED (1110) |

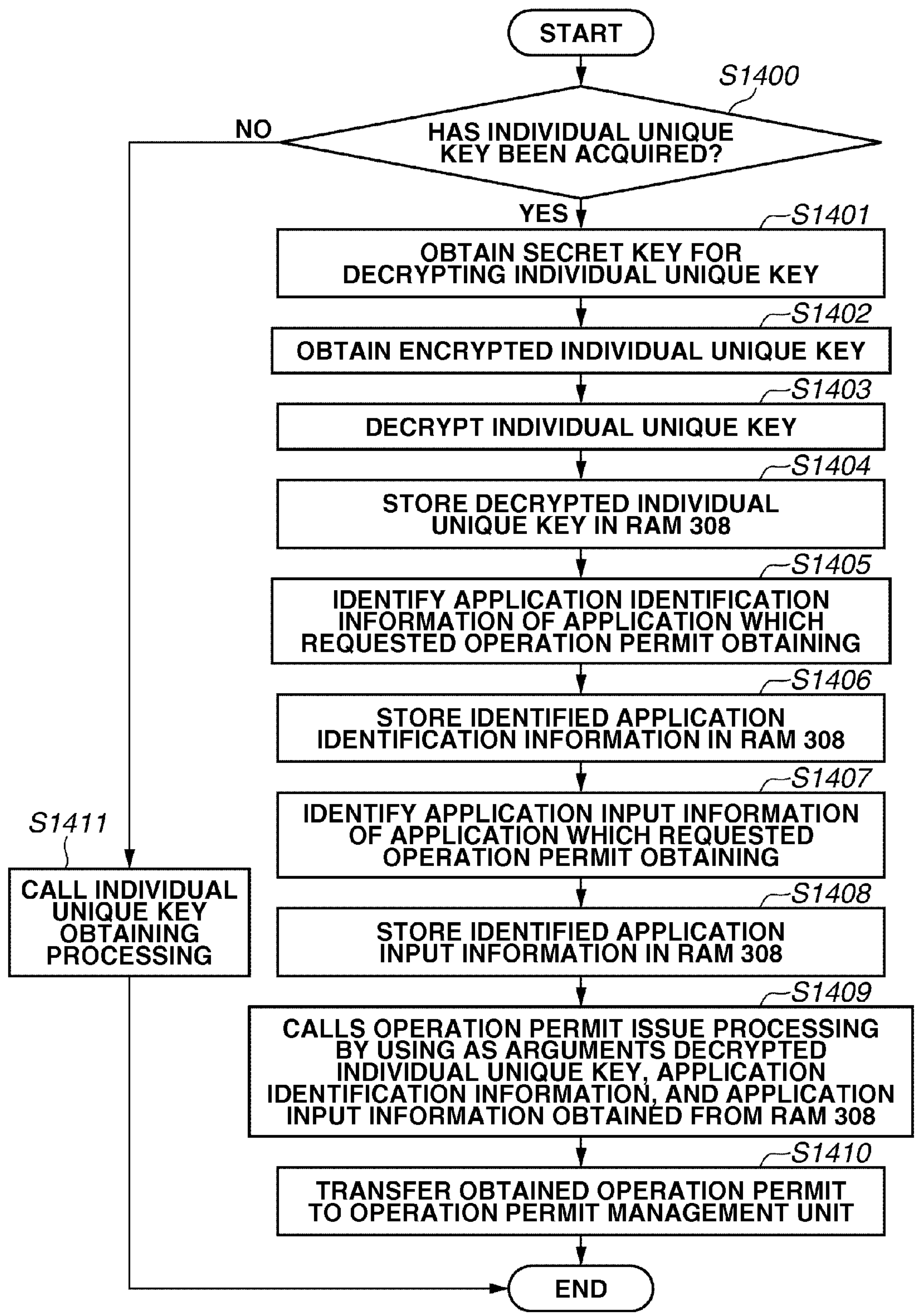
FIG.14A
START
S1400
HAS INDIVIDUAL UNIQUE KEY BEEN ACQUIRED?
NO
YES
S1401
OBTAIN SECRET KEY FOR DECRYPTING INDIVIDUAL UNIQUE KEY
S1402
OBTAIN ENCRYPTED INDIVIDUAL UNIQUE KEY
S1403
DECRYPT INDIVIDUAL UNIQUE KEY
S1404
STORE DECRYPTED INDIVIDUAL UNIQUE KEY IN RAM 308
S1405
IDENTIFY APPLICATION IDENTIFICATION INFORMATION OF APPLICATION WHICH REQUESTED OPERATION PERMIT OBTAINING
S1406
STORE IDENTIFIED APPLICATION IDENTIFICATION INFORMATION IN RAM 308
S1407
IDENTIFY APPLICATION INPUT INFORMATION OF APPLICATION WHICH REQUESTED OPERATION PERMIT OBTAINING
S1408
STORE IDENTIFIED APPLICATION INPUT INFORMATION IN RAM 308
S1409
CALLS OPERATION PERMIT ISSUE PROCESSING BY USING AS ARGUMENTS DECRYPTED INDIVIDUAL UNIQUE KEY, APPLICATION IDENTIFICATION INFORMATION, AND APPLICATION INPUT INFORMATION OBTAINED FROM RAM 308
S1410
TRANSFER OBTAINED OPERATION PERMIT TO OPERATION PERMIT MANAGEMENT UNIT
S1411
CALL INDIVIDUAL UNIQUE KEY OBTAINING PROCESSING
END

| FIG.15A |
| --- |
| FIG.15B |

IMAGE FORMING APPARATUS, INFORMATION PROCESSING METHOD, AND CONTROL METHOD

BACKGROUND

Field

Aspects of the present invention generally relate to an image forming apparatus, a control method, and a storage medium.

Description of the Related Art

Multifunction apparatuses are currently evolving as multifunction peripherals that integrate functions of image forming apparatuses, such as printers, copying machines, and facsimiles. (Hereinafter multifunctional apparatuses are referred to as image forming apparatuses). Recent years, the cloud technologies have been utilized upon user's requests. The cloud technologies are computing services achieved by utilizing application programs stored on the Internet (Hereinafter, cloud technologies are referred to as cloud services).

Cloud services provide users, for example, with a printing function. By using a personal computer, a mobile terminal, etc., users can send a print request to any desired image forming apparatus via the Internet, without using driver software. The image forming apparatus receiving a print request as the cloud service can receive the print request and perform printing by preliminary installing an application program for using a printing function as the cloud service Japanese Patent Application Laid-Open 2009-193275 discusses a technique for preventing unauthorized use when an image forming apparatus performs printing in cooperation with a server.

However, with the diversification of data used in the cloud services, further security risk reduction is demanded. Therefore, it has become necessary to solve security problems which cannot be solved by conventional techniques.

SUMMARY

Aspects of the present invention are generally directed to providing a technique for security risk reduction.

According to an aspect of the present invention, an image forming apparatus using a service provided by a server apparatus capable of communicating with the image forming apparatus via a network includes memory and a processor, the processor configured to decrypt encrypted common authentication information of the image forming apparatus based on secret key information for decrypting the common authentication information, request encrypted individual authentication information of the image forming apparatus from the server apparatus by using the decrypted common authentication information and individual identification information for identifying the image forming apparatus, and to obtain the encrypted individual authentication information from the server apparatus, and to request, based on individual authentication information obtained by decrypting the obtained encrypted individual authentication information and on service use information for using the service, request use permission information of the service from the server apparatus, and to obtain the use permission information from the server apparatus.

Further features of the present disclosure will become apparent from the following description of exemplary embodiments with reference to the attached drawings.

BRIEF DESCRIPTION OF THE DRAWINGS

FIG. 7 illustrates an example of a table managed by an operation permit management unit of the image forming apparatus.

FIG. 9 illustrates an example of a table managed by an application identification information management unit of the image forming apparatus.

FIG. 10 illustrates an example of a table managed by an issued individual unique key management unit of the server.

FIG. 11 illustrates an example of a table managed by an issued operation permit management unit of the server.

FIG. 14A is a flowchart illustrating processing for obtaining an operation permit.

DESCRIPTION OF THE EMBODIMENTS

Exemplary embodiments will be described below with reference to the accompanying drawings.

A first exemplary embodiment will be described below.

Figure 1:
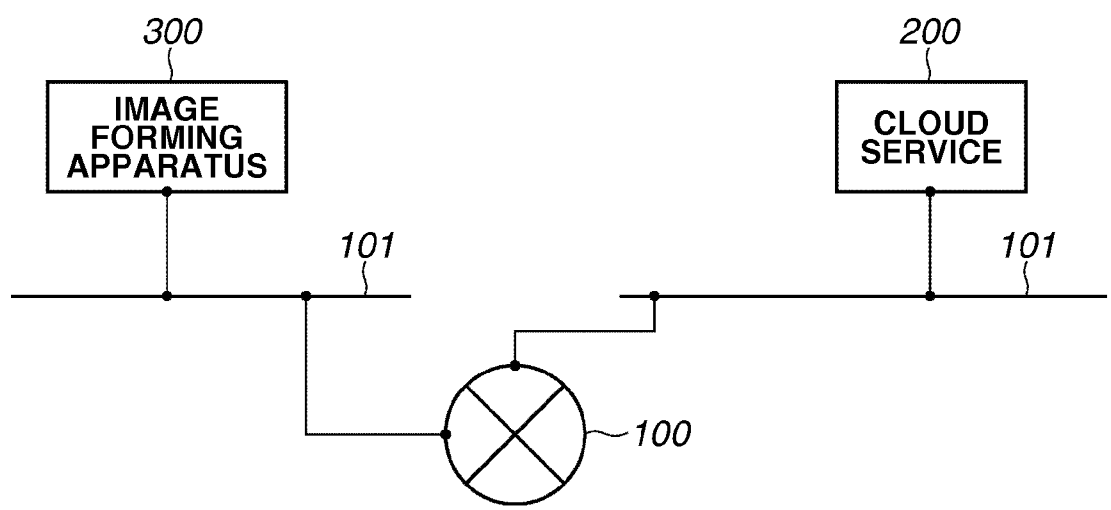
FIG. 1 illustrates an example of a system configuration.

FIG. 1 illustrates an example of a configuration of a system according to the present exemplary embodiment.

The system according to present exemplary embodiment includes an image forming apparatus 300, a cloud service 200, a wide area network (WAN) 100, and a local area network (LAN) 101. A world wide web (WWW) system is assumed to have been built in the present exemplary embodiment.

The cloud service 200, a cloud service provision server, is capable of providing an authentication service, a print service, and a form service. Therefore, the cloud service 200 can also be referred to as a cloud server. A server may be installed for each service. Hereinafter, services which provide a specific function on the Internet, such as print services and form services, are referred to as resource services.

One or a plurality of resource service cooperation application programs are pre-installed in the image forming apparatus 300. The user uses resource services by using these resource service cooperation applications.

The cloud service 200 and the image forming apparatus 300 are connected with each other via the WAN 100 and the LAN 101. The cloud service 200 and the image forming apparatus 300 may be configured on separate LANs or on the same LAN.

Figure 2:
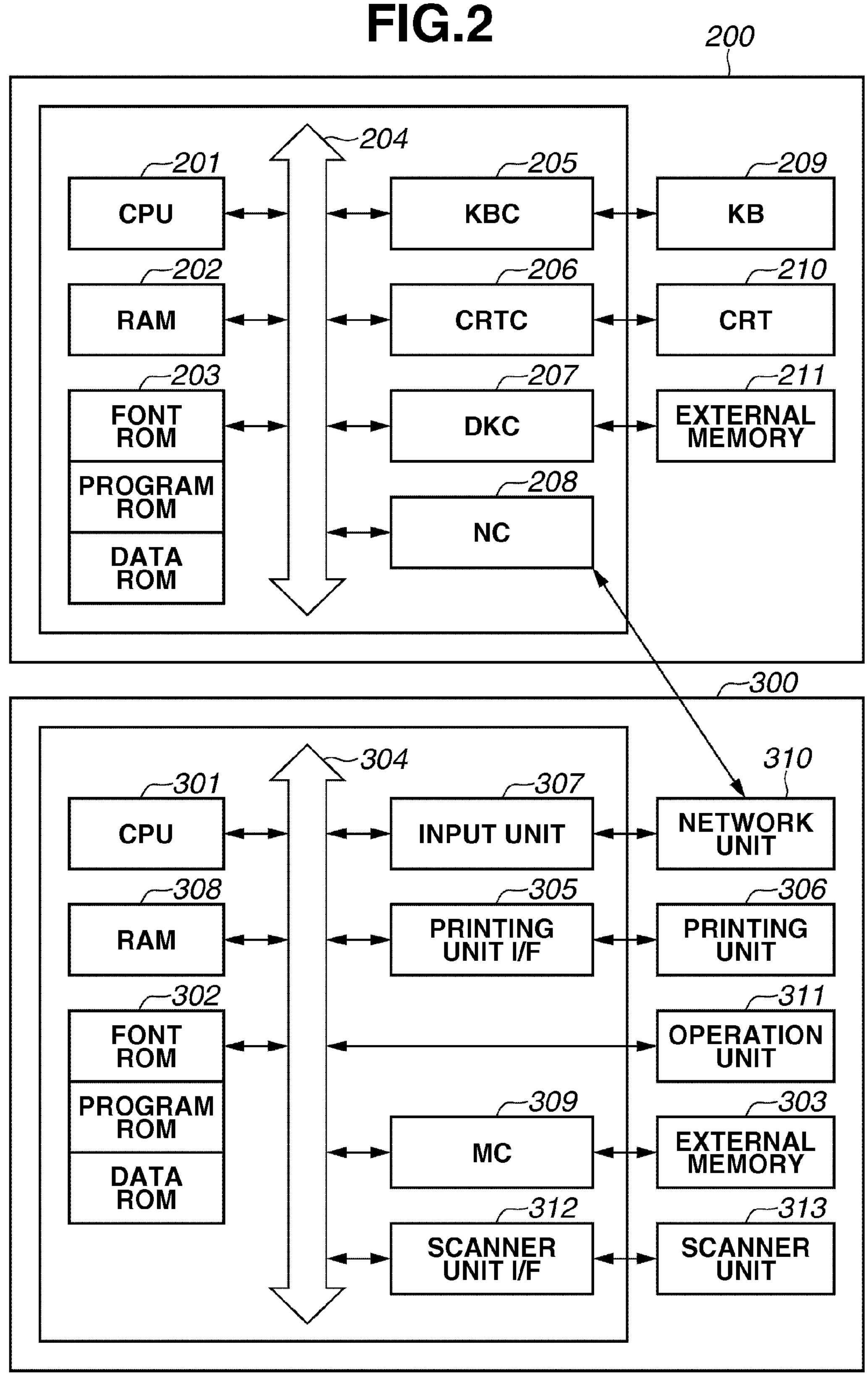
FIG. 2 illustrates examples of hardware configurations of a server and an image forming apparatus.

The cloud service 200 and the image forming apparatus 300 according to the present exemplary embodiment include hardware configurations as illustrated in FIG. 2.

FIG. 2 illustrates examples of hardware configurations of the cloud service 200 and the image forming apparatus 300. The cloud service 200 and the image forming apparatus 300 can communicate with each other via the WAN 100 and the LAN 101.

First, the hardware configuration of the cloud service 200 will be described below. The hardware block diagram of the cloud service 200 illustrated in FIG. 2 is equivalent to a hardware block diagram of a common information processing apparatus, and also applicable to a server which provides the cloud service 200 according to the present exemplary embodiment.

A central processing unit (CPU) 201 executes a program, such as an operating system (OS) and an application, stored in a program read-only memory (ROM) of a nonvolatile ROM 203, or loaded from a nonvolatile external memory 211, such as a hard disk (HD), into a RAM 202. Then, the CPU 201 controls each block connected to a system bus 204. The OS is an abbreviation of an operating system operating on a computer. Hereinafter, the operating system is simply referred to as OS.

The CPU 201 executes the above-described programs to achieve functions (software configurations) of the cloud service 200 and processing of flowcharts related to the cloud service 200 described below.

The RAM 202 is a volatile memory that functions as a main memory and a work area for the CPU 201.

A keyboard controller (KBC) 205 controls key inputs from a keyboard 209 and a pointing device (not illustrated).

A cathode ray tube (CRT) controller (CRTC) 206 controls display of a CRT display 210.

A disc controller (DKC) 207 controls data access in the external memory 211, such as a hard disk (HD) storing various data.

The network controller (NC) 208 performs processing for controlling communication with the image forming apparatus 300 and other apparatuses connected via the WAN 100 and the LAN 101.

Although the cloud service 200 (module) is achieved when the CPU 201 executes a relevant program, as described above, to simplify a description, the description will be given as if the cloud service 200 performed processing.

The following describes the hardware configuration of the image forming apparatus 300.

The CPU 301 controls each block connected to a system bus 304 based on a control program stored in a nonvolatile ROM 302 and a nonvolatile external memory 303. The CPU 301 outputs a generated image signal to a printing unit (image forming apparatus engine) 306 as output information via a printing unit interface (I/F) 305. The CPU 301 is capable of communicating with the cloud service 200 via an input unit 307 and a network unit 310, and notifying the cloud service 200 of information in the image forming apparatus 300.

The CPU 301 further executes the above-described programs to achieve software functions (software configurations) of the image forming apparatus 300 and processing of flowcharts related to the image forming apparatus 300 described below.

A program ROM in the ROM 302 stores control programs for the CPU 301. A font ROM in the ROM 302 stores font data used for output information generation. In the case of an image forming apparatus without the external memory 303, such as a hard disk, a data ROM in the ROM 302 stores information to be transmitted to and received from the cloud service 200.

A volatile RAM 308 functions as a main memory and a work area for the CPU 301, and is configured so that the memory capacity can be expanded by connecting an option RAM to an expansion port (not illustrated). The RAM 308 is used as an output information expansion area, an environmental data storage area, and a nonvolatile RAM (NVRAM).

Access to the external memory 303 is controlled by a memory controller (MC) 309. The external memory 303 is connected as an option to store font data, an emulation program, and form data.

An operation unit 311 includes operation switches and light emitting diode (LED) indicators.

Although an application is implemented when the CPU 301 executes a relevant program, to simplify a description, the description will be given as if the application performed relevant processing. An application program to be added to the image forming apparatus 300 describes procedures of processing for accessing the cloud service 200. Once the application program is installed in the image forming apparatus 300, the application program is developed on the hard disk in a format readable at the time of execution by the CPU 301 of the image forming apparatus 300. Then, the CPU 301 of the image forming apparatus 300 calls the cloud service 200 based on the above-described procedures.

To access the cloud service 200, the image forming apparatus 300 uses default credentials and device credentials. The default credential refers to a common key (hereinafter referred to as an initial common key) used as a common default key commonly used by a plurality of image forming apparatuses 300 to access the cloud service 200. This means that a plurality of image forming apparatuses 300 is provided with the same initial common key. The device credential refers to an authentication key (hereinafter referred to as an individual unique key) which permits access to the cloud service 200 on a device basis. This means that a plurality of image forming apparatuses 300 is provided with respective individual unique keys different from each other.

The user can remove the hard disk of the image forming apparatus 300 for the purpose of the security of data developed in a readable format.

Figure 3:
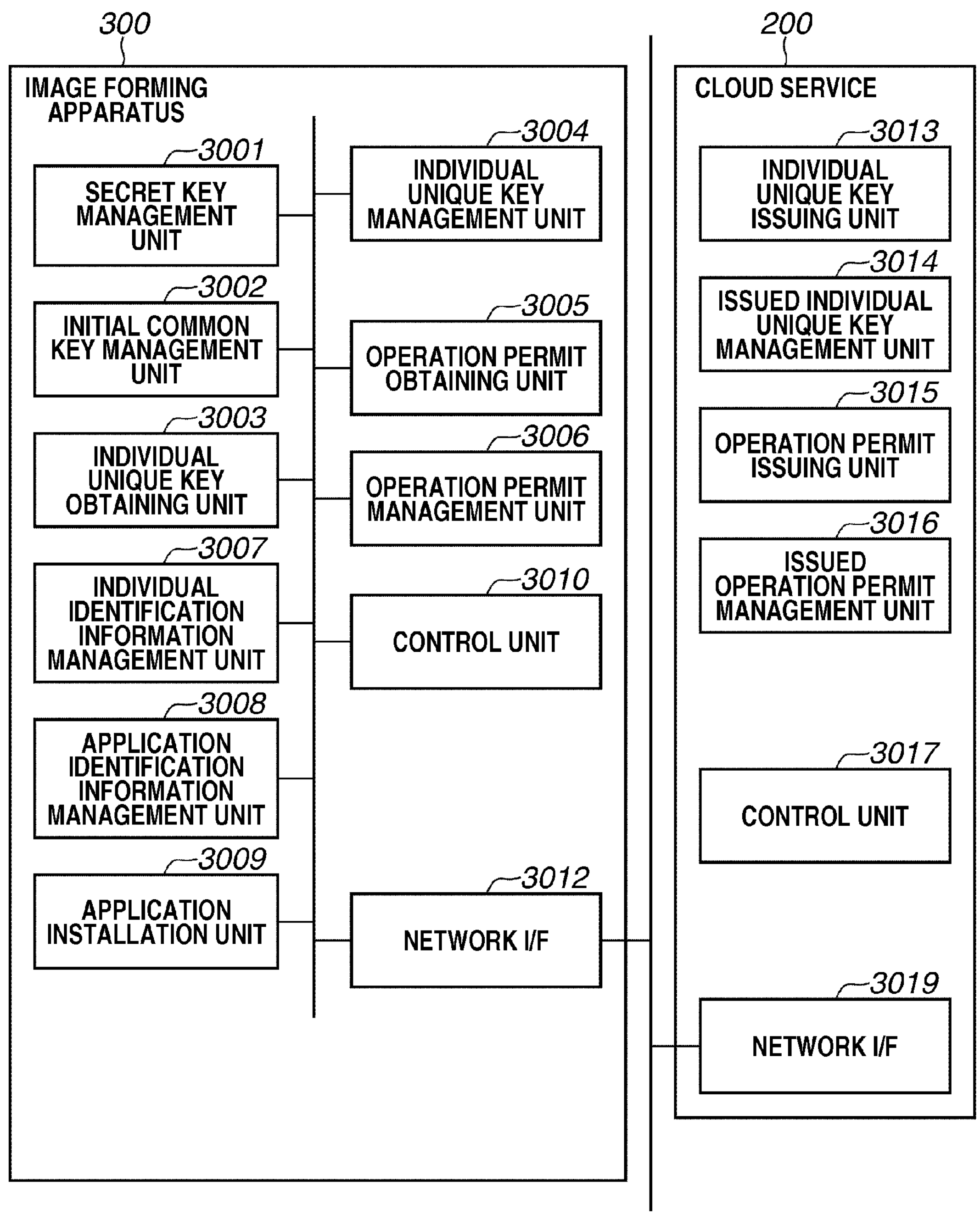
FIG. 3 illustrates examples of software configurations of the server and the image forming apparatus.

FIG. 3 illustrates examples of software configurations of the image forming apparatus 300 and the cloud service 200 according to the present exemplary embodiment.

The secret key management unit 3001 manages keys for decrypting encrypted data held by the initial common key management unit 3002 and the individual unique key management unit 3004.

The initial common key management unit 3002 manages an encrypted initial common key. The initial common key management unit 3002 provides a function of encrypting and storing an initial common key, a function of returning the encrypted initial common key, and a function of deleting the initial common key to be managed. The initial common key is an example of common authentication information of the image forming apparatus 300.

The individual unique key obtaining unit 3003 obtains an individual unique key from the cloud service 200 by using the encrypted initial common key obtained from the initial common key management unit 3002, and information (described below) obtained from the individual identification information management unit 3007. The individual unique key is an example of individual authentication information of the image forming apparatus 300.

The individual unique key management unit 3004 manages the individual unique key obtained by the individual unique key obtaining unit 3003. The individual unique key management unit 3004 encrypts and holds the individual unique key obtained by the individual unique key obtaining unit 3003, and, upon reception of an obtaining request, returns the encrypted individual unique key.

The operation permit obtaining unit 3005 obtains an access token from the cloud service 200 by using information held by an application identification information management unit 3008 (described below), information held by the individual unique key management unit 3004, and input information designated by arguments, such as user information. The access token refers to an operation access permit (hereinafter referred to as an operation permit) for input information, such as user information, issued by the cloud service 200. For example, an application using the printing function of the image forming apparatus 300 uses an operation permit to access the cloud service 200 a plurality of number of times to provide processing. Then, the above-described application reuses in subsequent processing an operation permit obtained in operation permit obtaining processing to enable ensuring security and improving user's convenience. The operation permit is an example of use permission information.

The operation permit management unit 3006 manages an operation permit obtained by the operation permit obtaining unit 3005, and provides the operation permit to be managed.

The individual identification information management unit 3007 manages the device identification information of the image forming apparatus 300, and provides the device identification information to be managed.

The application identification information management unit 3008 manages unique identification information held by the application program, and provides the identification information to be managed.

The application installation unit 3009 provides a function of installing and developing an application program in the image forming apparatus 300.

The individual unique key issuing unit 3013 receives an initial common key and device identification information from the image forming apparatus 300, and issues individual unique keys differing from respective devices.

The issued individual unique key management unit 3014 manages individual unique key information issued by the individual unique key issuing unit 3013.

The operation permit issuing unit 3015 receives an individual unique key, application program identification information, and input information from the image forming apparatus 300, and issues an operation permit.

The issued operation permit management unit 3016 manages the operation permit information issued by the operation permit issuing unit 3015.

The control units 3010 and 3017 control processing of various functions, such as management and call of various functions, based on application programs stored in the ROMs 302 and 203.

The network I/Fs 3012 and 3019 are configured, similar to the network controller 208 and the network unit 310, as network devices for performing communication with other apparatuses via a network.

Figure 4:
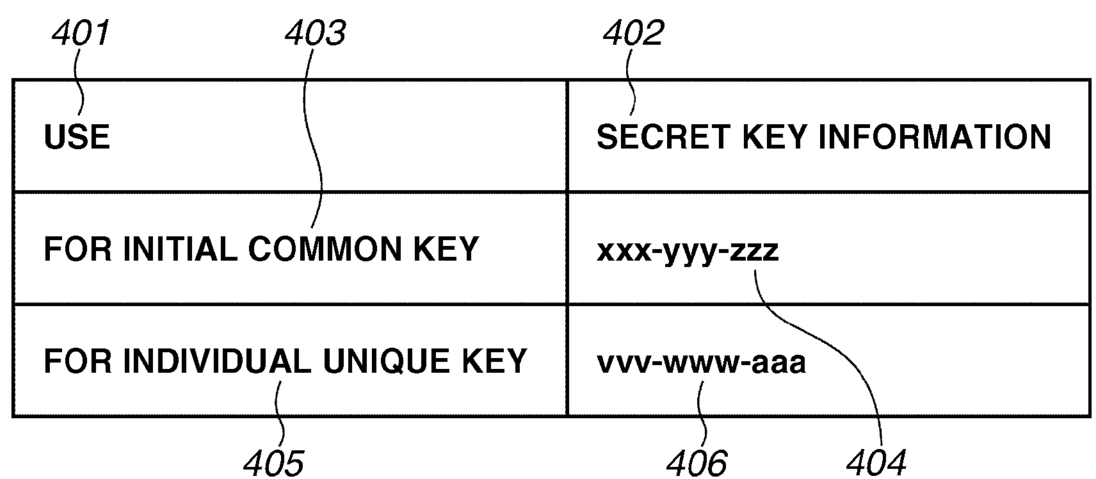
FIG. 4 illustrates an example of a table managed by a secret key management unit of the image forming apparatus.

FIG. 4 illustrates an example of a table managed by the secret key management unit 3001.

The table illustrated in FIG. 4 includes two pieces of secret key information 402 usable for the respective use 401, i.e., use for the initial common key 403 and use for the individual unique key 405. The secret key management unit 3001 returns the secret key information 404 or 406 corresponding to a designated use 403 or 405, respectively. The secret key information for the initial common key is obtained by installing an access token obtaining application. The secret key information for the individual unique key is obtained in step S1308 (described below) illustrated in FIG. 13A.

Figure 5:
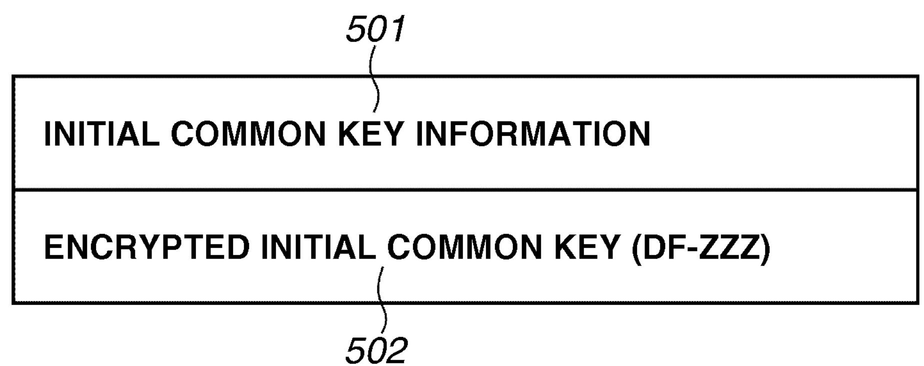
FIG. 5 illustrates an example of a table managed by an initial common key management unit of the image forming apparatus.

FIG. 5 illustrates an example of a table managed by the initial common key management unit 3002. The table illustrated in FIG. 5 includes one piece of information of an encrypted initial common key "DF-ZZZ" 502 corresponding to usable initial common key information 501. In the present exemplary embodiment, the table describes the readable data "DF-ZZZ" 502 for convenience of descriptions.

Figure 6:
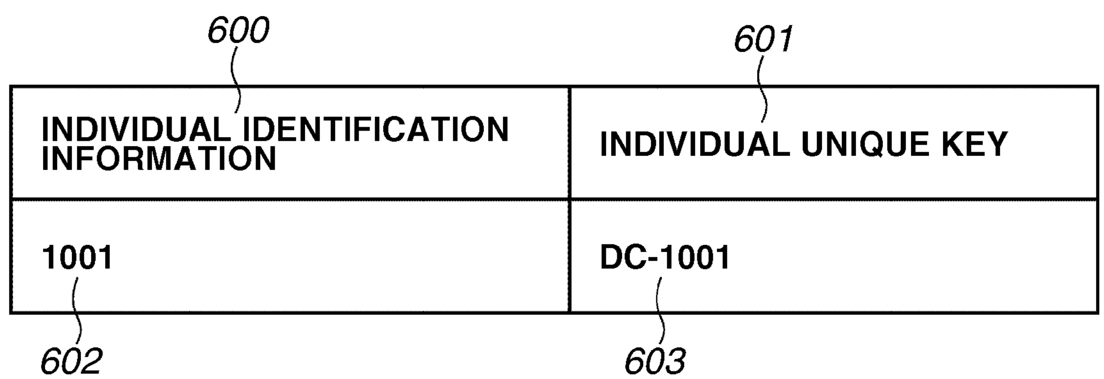
FIG. 6 illustrates an example of a table managed by an individual unique key management unit of the image forming apparatus.

FIG. 6 illustrates an example of a table managed by the individual unique key management unit 3004.

The table illustrated in FIG. 6 includes one piece of usable individual unique key 601 corresponding to device identification information (hereinafter referred to as individual identification information) 600. More specifically, the table includes individual identification information "1001" 602 and an individual unique key "DC-1001" 603 corresponding to the individual identification information "1001" 602. The individual unique key management unit 3004 encrypts and stores the individual unique key 601. In the present exemplary embodiment, the table describes readable data for convenience of descriptions.

FIG. 7 illustrates an example of a table managed by the operation permit management unit 3006.

The table illustrated in FIG. 7 includes one piece of an operation permit 704 obtained corresponding to an individual unique key 701, application identification information 702, and application input information 703. More specifically, the table includes an individual unique key "DC-1001" 705, application identification information "Appl-0002" 706, application input information "USER-AA" 707, and an operation permit "AT-00A" 708. The application input information 703 refers to authentication information, such as a user name, a password, and information of an access destination server which need to be input to use the cloud service 200. The application input information 703 is an example of service authentication information necessary to use the cloud service 200.

Figure 8:
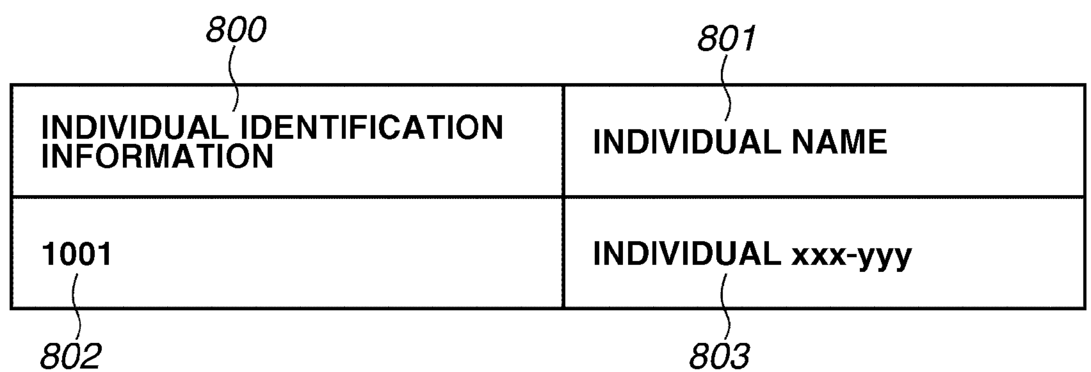
FIG. 8 illustrates an example of a table managed by an individual identification information management unit of the image forming apparatus.

FIG. 8 illustrates an example of a table managed by the individual identification information management unit 3007.

The table illustrated in FIG. 8 includes one set of individual identification information 800 and an individual name 801 as device-related information. More specifically, the table includes individual identification information "1001" 802 and an individual name "INDIVIDUAL xxx-yyy" 803 corresponding to the individual identification information "1001" 802.

FIG. 9 illustrates an example of a table managed by the application identification information management unit 3008.

The table illustrated in FIG. 9 includes two sets of an application name 902 and an initial common key 907 ("INCLUDED" or "NOT INCLUDED") corresponding to the application identification information 900. The table illustrated in FIG. 9 indicates a state where two different usable application programs have been installed in the image forming apparatus 300. The table illustrated in FIG. 9 is generated by the processing in step S1206 illustrated in FIG. 12 (described below). The initial common key 907 indicates whether a relevant application program holds the initial common key. More specifically, an application name "ACCESS TOKEN OBTAINING APPLICATION" 904 corresponding to application identification information "Appl-0001" 903 is an application program including an encrypted initial common key. An application name "PRINTING APPLICATION" 906 corresponding to application identification information "Appl-0002" 905 is an application program not including an encrypted initial common key.

Figure 10:
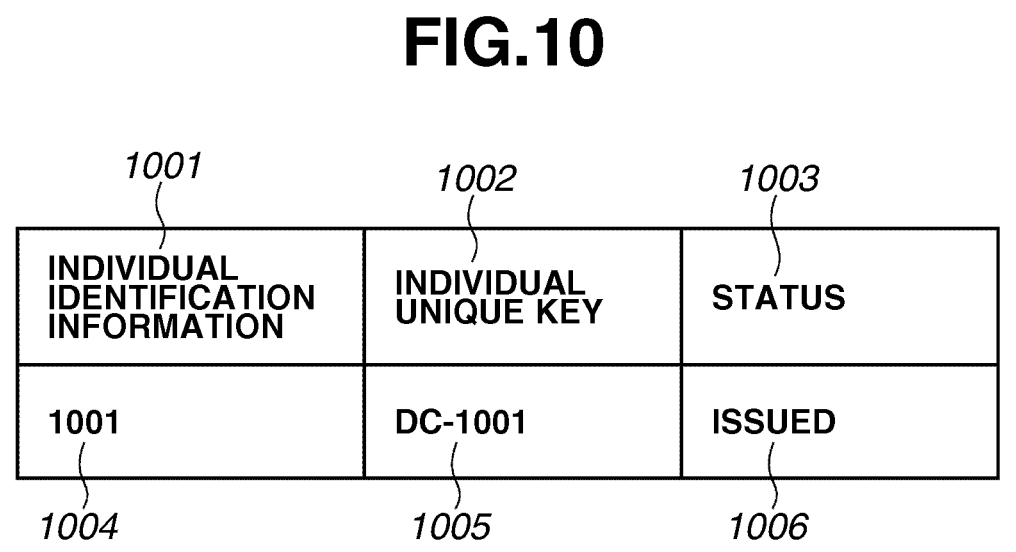

FIG. 10 illustrates an example of a table managed by the issued individual unique key management unit 3014.

The table illustrated in FIG. 10 includes one set of an individual unique key 1002 and a status 1003 corresponding to the individual identification information 1001. The table illustrated in FIG. 10 includes an issued individual unique key. More specifically, an individual unique key corresponding to individual identification information "1001" 1004 is "DC-1001" 1005, and a status thereof is "ISSUED" 1006.

FIG. 11 illustrates an example of a table managed by the issued operation permit management unit 3016.

The table illustrated in FIG. 11 includes one set of an operation permit 1104 issued corresponding to an individual unique key 1101, application identification information 1102, and application input information 1103 and a status 1105. More specifically, the table includes as data keys an individual unique key "DC-1001" 1106, application identification information "Appl-0002" 1107, and application input information "USER-AA" 1108. The table further includes as corresponding data an operation permit "AT-00A" 1109 and a status "ISSUED" 1110.

Figure 12:
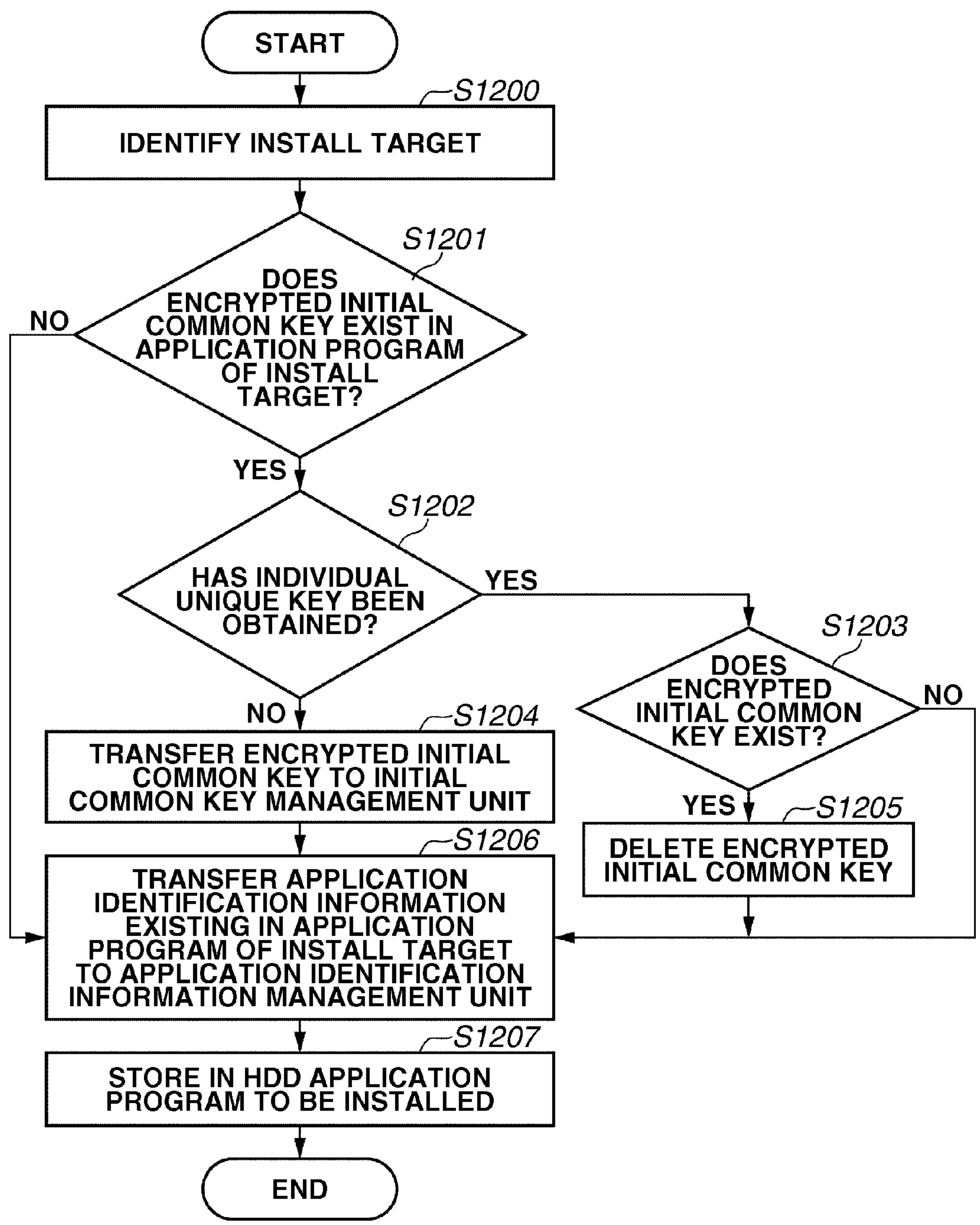
FIG. 12 is a flowchart illustrating processing for installing an application program.

FIG. 12 is a flowchart illustrating an example of processing performed by the control unit 3010 after the application installation unit 3009 recognizes the installation of files for the access token obtaining application 904 until storing the access token obtaining application 904 in the external memory 303.

In step S1200, the control unit 3010 identifies application information of an install target. More specifically, the control unit 3010 achieves the processing in step S1200 by obtaining, for example, the application identification information and the application name from the application program of the install target.

In step S1201, the control unit 3010 determines whether the application program of the install target includes an encrypted initial common key. The control unit 3010 determines whether the application program includes an initial common key by obtaining information about the initial common key 907 in the table illustrated in FIG. 9 managed by the application identification information management unit 3008. More specifically, the control unit 3010 searches in the table illustrated in FIG. 9 for information about the initial common key corresponding to the application information of the install target identified in step S1200, and determines whether the relevant information includes an encrypted initial common key. The table illustrated in FIG. 9 is generated in the processing in step S1206, and therefore does not exist when the image forming apparatus 300 installs an application for the first time. Therefore, when the image forming apparatus 300 installs the application for the first time, the control unit 3010 determines that the result is "NO" in step S1201. If the control unit 3010 determines that the application program of the install target includes an encrypted initial common key (YES in step S1201), the processing proceeds to step S1202. Otherwise, if the control unit 3010 determines that an encrypted initial common key is not included (NO in step S1201), the processing proceeds to step S1206.

In step S1202, the control unit 3010 obtains information to be managed by the individual unique key management unit 3004, and determines whether an individual unique key has been obtained. More specifically, the control unit 3010 searches in the table illustrated in FIG. 6 (managed by the individual unique key management unit 3004) for an individual unique key, and determines whether an individual unique key has been obtained. If the control unit 3010 determines that an individual unique key has already been obtained (YES in step S1202), the processing proceeds to step S1203. Otherwise, if the control unit 3010 determines that an individual unique key has not yet been obtained (NO in step S1202), the processing proceeds to step S1204.

In step S1203, the control unit 3010 obtains information held by the initial common key management unit 3002, and determines whether an encrypted initial common key exists in the relevant information. More specifically, the control unit 3010 searches in the table illustrated in FIG. 5 (managed by the initial common key management unit 3002) for an encrypted initial common key, and determines whether an encrypted initial common key exists in the relevant information. If the control unit 3010 determines that an encrypted initial common key exists in the relevant information (YES in step S1203), the processing proceeds to step S1205. Otherwise, when the control unit 3010 determines that an encrypted initial common key does not exist (NO in step S1203), the processing proceeds to step S1206. In step S1205, the control unit 3010 deletes the encrypted initial common key held by the initial common key management unit 3002. The encrypted initial common key is used to obtain an individual unique key. If an individual unique key is determined to have been obtained (YES in step S1202), it becomes no longer necessary to hold the encrypted initial common key, and the encrypted initial common key is deleted in step S1205, as described above. This processing enables further improving security.

In step S1204, the control unit 3010 transfers to the initial common key management unit 3002 the encrypted initial common key included in the application program of the install target.

In step S1206, the control unit 3010 transfers to the application identification information management unit 3008 the application identification information and the application name included in the application program of the install target. The table illustrated in FIG. 9 is generated when the application identification information management unit 3008 manages the application identification information and the application name transferred from the control unit 3010.

In step S1207, the control unit 3010 stores in the external memory 303 the application program of the install target.

Figure 13A:
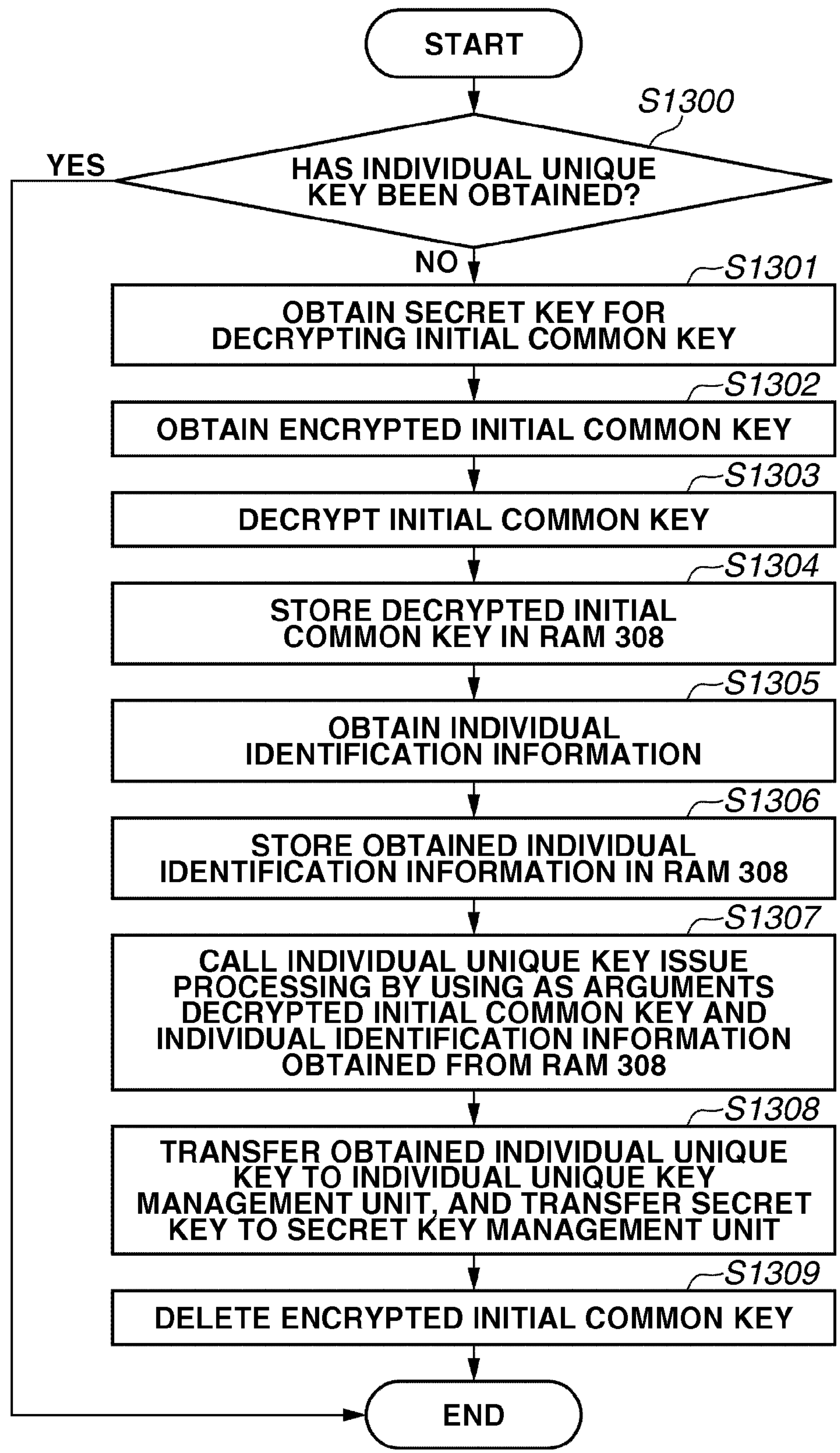
FIG. 13A is a flowchart illustrating processing for obtaining an individual unique key.

FIG. 13A is a flowchart illustrating an example of processing performed by the control unit 3010 after the individual unique key obtaining unit 3003 recognizes an individual unique key obtaining request until obtaining an individual unique key. The flowchart illustrated in FIG. 13A starts when the access token obtaining application has been installed and then activated.

In step S1300, the control unit 3010 obtains information held by the individual unique key management unit 3004, and determines whether an individual unique key has been obtained. More specifically, the control unit 3010 obtains the individual unique key 601 in the table illustrated in FIG. 6 held by the individual unique key management unit 3004, and determines whether an individual unique key has been obtained. If the control unit 3010 determines that an individual unique key has already been obtained (YES in step S1300), the processing ends. Otherwise, if the control unit 3010 determines that an individual unique key has not yet been obtained (NO in step S1300), the processing proceeds to step S1301.

In step S1301, the control unit 3010 obtains secret key information "xxx-yyy-zzz" 404 for the initial common key from the secret key management unit 3001.

In step S1302, the control unit 3010 obtains the encrypted initial common key "DF-ZZZ" 502 held by the initial common key management unit 3002.

In step S1303, the control unit 3010 decrypts the encrypted initial common key obtained in step S1302 by using the secret key information 404 for the initial common key obtained in step S1301.

In step S1304, the control unit 3010 stores in the RAM 308 the initial common key decrypted in step S1303.

In step S1305, the control unit 3010 obtains the individual identification information held by the individual identification information management unit 3007. More specifically, the control unit 3010 obtains the individual identification information "1001" 802 and the individual name "INDIVIDUAL xxx-yyy" 803 corresponding to the individual identification information "1001" 802.

In step S1306, the control unit 3010 stores in the RAM 308 the individual identification information obtained in step S1305.

In step S1307, the control unit 3010 obtains the decrypted initial common key "DF-ZZZ" 502 and the individual identification information "1001" 802 from the RAM 308. Then, by using the above-described obtained information as arguments, the control unit 3010 calls individual unique key issue processing illustrated in FIG. 13B (described below) from the cloud service 200 via the network I/F 3012, and requests individual unique key obtaining. The above-described individual unique key obtaining is an example of individual authentication information obtaining processing.

In step S1308, the control unit 3010 obtains via the network I/F 3012 the individual unique key as a result of the individual unique key issue processing performed by the cloud service 200 illustrated in FIG. 13B (described below). Then, the control unit 3010 transfers the obtained individual unique key to the individual unique key management unit 3004. The individual unique key management unit 3004 stores the individual unique key "DC-1001" corresponding to the individual identification information "1001". Then, the control unit 3010 transfers to the secret key management unit 3001 a secret key for decrypting the individual unique key to be enclosed and transferred together. The secret key management unit 3001 stores the secret key transferred from the control unit 3010 as the secret key information 406 for the individual unique key 405.

In step S1309, the control unit 3010 deletes the encrypted initial common key held by the initial common key management unit 3002.

Figure 13B:
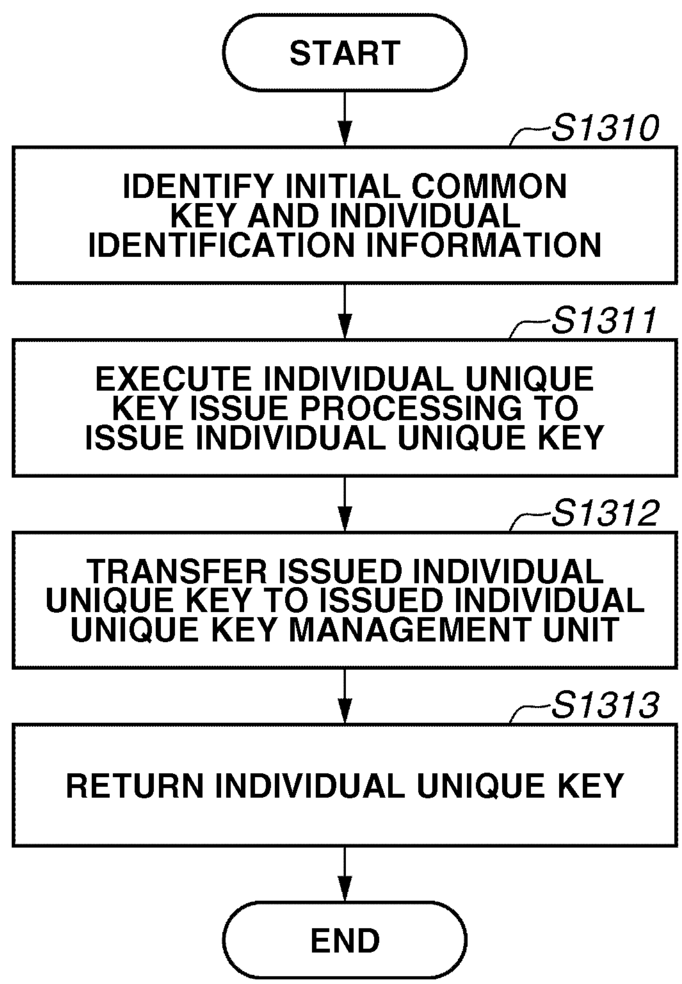
FIG. 13B is a flowchart illustrating processing for issuing an individual unique key.

FIG. 13B is a flowchart illustrating an example of processing performed by the control unit 3017 after the individual unique key issuing unit 3013 recognizes an individual unique key issue request until issuing an individual unique key. In step S1310, the control unit 3017 identifies the initial common key and the individual identification information to be obtained from the image forming apparatus 300 via the network I/F 3019. In the present exemplary embodiment, the image forming apparatus 300 transfers the initial common key "DF-ZZZ" and the device identification information "1001" to the cloud service 200.

In step S1311, the control unit 3017 performs the individual unique key issue processing based on the information identified in step S1310 to issue an individual unique key. In the present exemplary embodiment, the control unit 3017 issues the individual unique key "DC-1001" 1005.

In step S1312, the control unit 3017 transfers the individual unique key "DC-1001" 1005 issued in step S1311 to the issued individual unique key management unit 3014. The issued individual unique key management unit 3014 stores data corresponding to individual identification information "1001" 1004 transferred from the control unit 3017. More specifically, the issued individual unique key management unit 3014 stores data having the individual unique key "DC-1001" 1005 issued in step S1311 and the status "ISSUED" 1006.

In step S1313, the control unit 3017 returns via the network I/F 3019 the individual unique key issued in step S1311 to the image forming apparatus 300. When the control unit 3017 returns the encrypted individual unique key to the image forming apparatus 300, the control unit 3017 encloses the secret key for decrypting the encrypted individual unique key. A series of processing for issuing the above-described individual unique key and transmitting it to the image forming apparatus 300 is an example of individual authentication information issuing processing.

FIG. 14A is a flowchart illustrating an example of processing performed by the control unit 3010 after the operation permit obtaining unit 3005 recognizes an operation permit obtaining request until obtaining an operation permit. In step S1400, the control unit 3010 obtains the information held by the individual unique key management unit 3004, and determines whether an individual unique key has been obtained. More specifically, the control unit 3010 obtains the individual unique key 601 in the table illustrated in FIG. 6 managed by the individual unique key management unit 3004, and determines whether an individual unique key has been obtained. If the control unit 3010 determines that an individual unique key has already been obtained (YES in step S1400), the processing proceeds to step S1401. Otherwise, if the control unit 3010 determines that an individual unique key has not yet been obtained, the processing proceeds to step S1411.

In step S1401, the control unit 3010 obtains secret key information "vvv-www-aaa" 406 for the individual unique key from the secret key management unit 3001.

In step S1402, the control unit 3010 obtains the encrypted individual unique key held by the individual unique key management unit 3004. More specifically, the control unit 3010 obtains the encrypted individual unique key "DC-1001" 603 corresponding to the individual identification information "1001" 602 from the individual unique key management unit 3004.

In step S1403, by using the secret key information "vvv-www-aaa" 406 for the individual unique key obtained in step S1401, the control unit 3010 decrypts the encrypted individual unique key obtained in step S1402.

In step S1404, the control unit 3010 stores in the RAM 308 the individual unique key decrypted in step S1403.

In step S1405, the control unit 3010 identifies an application program which requested the operation permit obtaining, and obtains the application identification information of the identified application program from the application identification information management unit 3008. In the present exemplary embodiment, the application program which requested the operation permit obtaining is assumed to be an application program corresponding to the application identification information "Appl-0002" 905.

In step S1406, the control unit 3010 stores in the RAM 308 the application identification information identified in step S1405. In the present exemplary embodiment, as described above, the application identification information identified in step S1405 is assumed to be "Appl-0002" 905.

In step S1407, the control unit 3010 confirms the application program which requested the operation permit obtaining identified in step S1405, and identifies application input information.

In step S1408, the control unit 3010 stores in the RAM 308 the application input information identified in step S1407. In the present exemplary embodiment, the application input information is assumed to be "USER-AA".

In step S1409, the control unit 3010 obtains from the RAM 308 the decrypted individual unique key "DC-1001", the application identification information "Appl-0002", and the application input information "USER-AA". The control unit 3010 calls via the network I/F 3012 operation permit issue processing to be performed by the cloud service 200 illustrated in FIG. 14B (described below) using as arguments the above-described information obtained from the RAM 308. The application identification information and the application input information are examples of service use information.

In step S1410, the control unit 3010 requests via the network I/F 3012 the operation permit obtaining as a result of the operation permit issue processing performed by the cloud service 200 illustrated in FIG. 14B (described below). The above-described operation permit obtaining is an example of use permission information obtaining processing. The control unit 3010 transfers to the operation permit management unit 3006 the operation permit obtained from the cloud service 200. The control unit 3010 transfers as data keys the individual unique key "DC-1001" 705, the application identification information "Appl-0002" 706, and the application input information "USER-AA" 707 to the operation permit management unit 3006. The operation permit management unit 3006 associates the operation permit "AT-00A" 708 with the data keys and stores them.

In step S1411, the control unit 3010 performs the individual unique key obtaining processing in steps S1300 to step S1313 in the flowchart illustrated in FIGS. 13A and 13B.

Figure 14B:
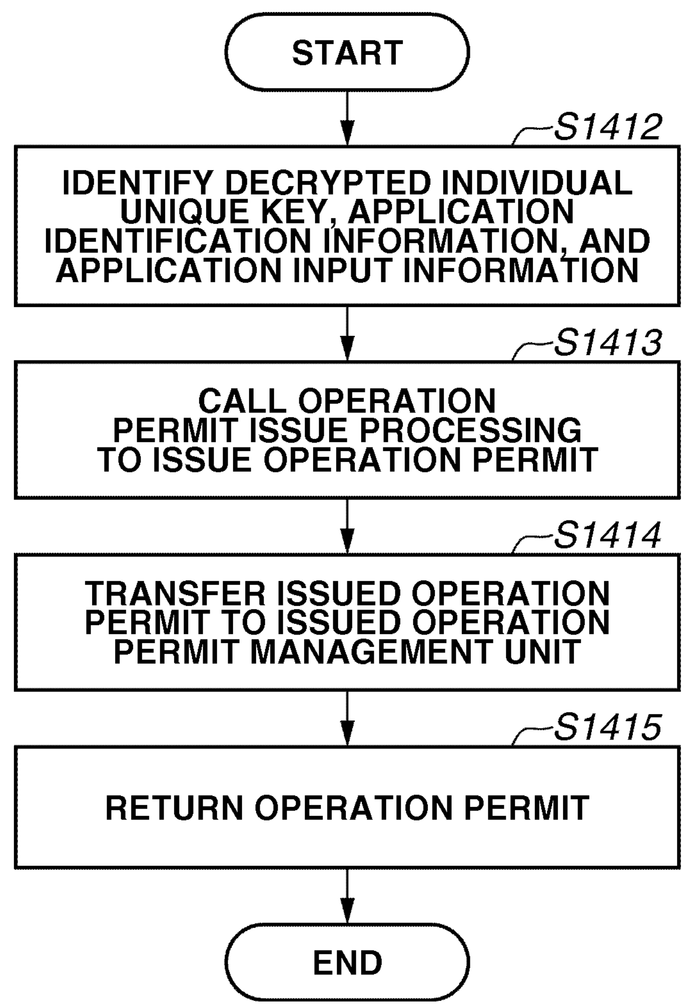
FIG. 14B is a flowchart illustrating processing for issuing an operation permit.

FIG. 14B is a flowchart illustrating an example of processing performed by the control unit 3017 after the operation permit issuing unit 3015 recognizes an operation permit issue request until issuing an operation permit. In step S1412, the control unit 3017 identifies the individual unique key, the application identification information, and the application input information to be obtained from the image forming apparatus 300 via the network I/F 3019. In the present exemplary embodiment, the control unit 3017 identifies the individual unique key "DC-1001", the application identification information "Appl-0002", and the application input information "USER-AA".

In step S1413, based on the information identified in step S1412, the control unit 3017 performs the operation permit issue processing to issue an operation permit. In the present exemplary embodiment, the control unit 3017 issues the operation permit "AT-00A" in the operation permit issue processing.

In step S1414, the control unit 3017 transfers the operation permit "AT-00A" issued in step S1413 to the issued operation permit management unit 3016. The issued operation permit management unit 3016 stores data corresponding to the unique key "DC-1001" 1106, the application identification information "Appl-0002" 1107, and the application input information "USER-AA" 1108. In present exemplary embodiment, the data corresponding to the above-described information includes the operation permit "AT-00A" 1109 and the status "ISSUED" 1110.

In step S1415, the control unit 3017 returns via the network I/F 3019 the processing result of the operation permit issued in step S1413 to the image forming apparatus 300. A series of processing for issuing the above-described operation permit and transmitting it to the image forming apparatus 300 is an example of the use permission information issue processing. The above-described processing enables the application identified in step S1405 to cooperate with the cloud service 200 by using the operation permit.

Figures 15, 15A:
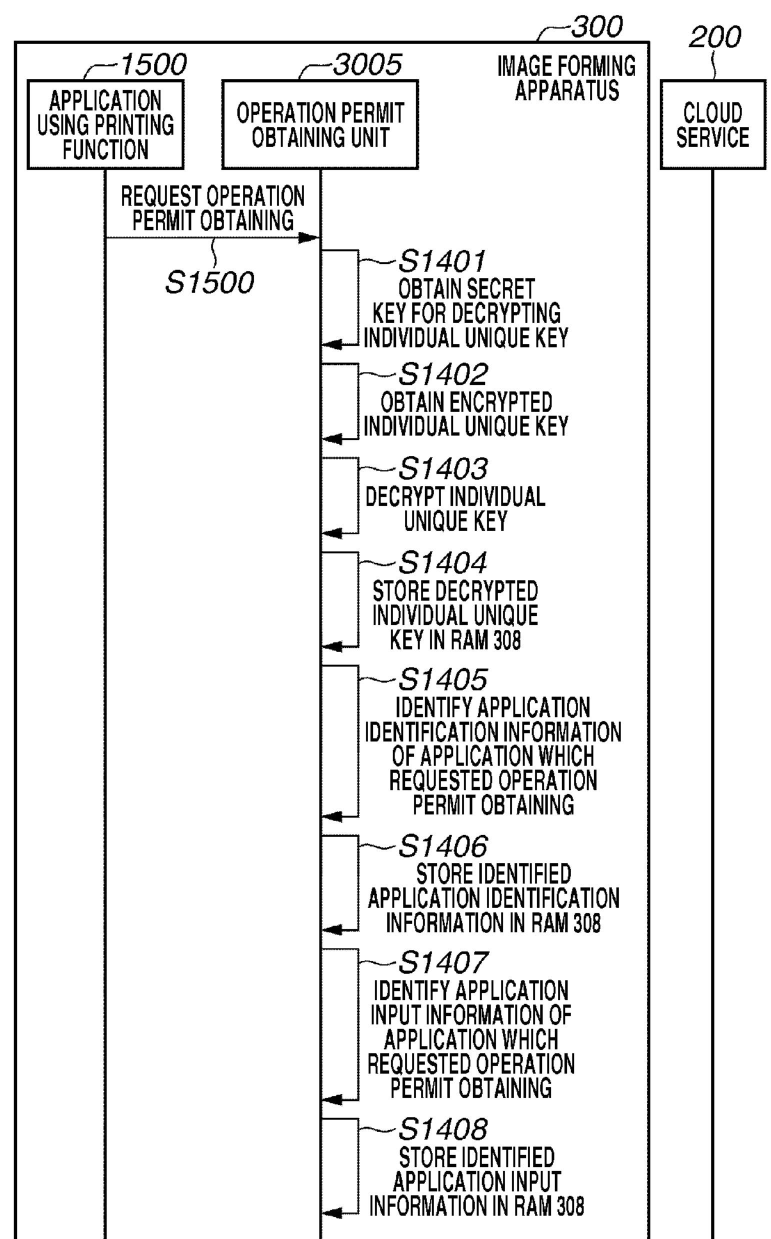
FIG. 15, which is composed of FIGS. 15A and 15B, illustrates an example of an overall processing sequence.
Figure 15B:
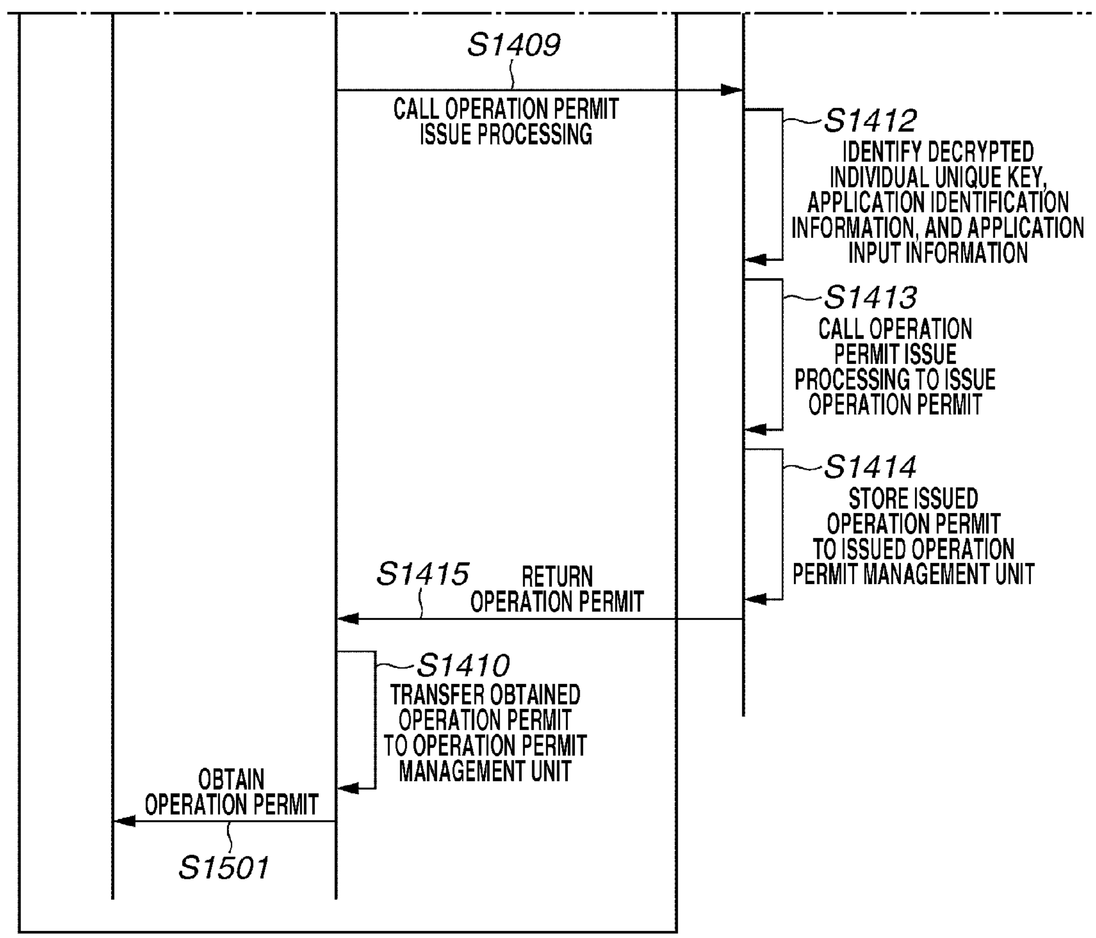

FIG. 15, which is composed of FIGS. 15A and 15B, illustrates an example of an overall processing sequence after the application 1500 of the image forming apparatus 300 using the printing function issues an operation permit obtaining request until obtaining an operation permit. In this processing sequence, the individual unique key obtaining unit 3003 of the image forming apparatus 300 is assumed to have already obtained individual unique key provided by the individual unique key issuing unit 3013 of the cloud service 200.

In step S1500, the application 1500 using the printing function requests the operation permit obtaining to start the use of the cloud service 200 from the operation permit obtaining unit 3005. Upon recognition of the operation permit obtaining request, the operation permit obtaining unit 3005 performs the above-described processing in steps S1401 to S1409, i.e., a processing sequence for the operation permit obtaining, and then performs the processing in step S1410. As described above, in step S1400, the individual unique key obtaining unit 3003 has already obtained an individual unique key.

The operation permit obtaining unit 3005 performs processing in steps S1401 to S1409. In step S1409, by using as arguments the individual unique key "DC-1001", the application identification information "Appl-0002", and the application input information "USER-AA", the control unit 3017 calls the operation permit issue processing to be performed by the operation permit issuing unit 3015.

The cloud service 200 performs the processing in steps S1412 to S1415. in step S1414, the issued operation permit management unit 3016 stores data corresponding to the individual unique key "DC-1001" 1106, the application identification information "Appl-0002" 1107, and the application input information "USER-AA" 1108. In present exemplary embodiment, the data corresponding to the above-described information includes the operation permit "AT-00A" 1109 and the status "ISSUED" 1110.

In step S1415, the control unit 3017 returns via the network I/F 3019 the operation permit issued in step S1413 to the image forming apparatus 300.

In step S1410, the operation permit obtaining unit 3005 transfers the received operation permit to the operation permit management unit 3006.

In step S1501, the application 1500 obtains the operation permit "AT-00A" which the application 1500 requested from the operation permit obtaining unit 3005, together with the corresponding data.

The initial common key and the individual unique key are issued by the cloud service 200 to guarantee that the application 1500 for obtaining the operation permit connects with the cloud service 200. If an individual unique key is implemented in each image forming apparatus in advance, management becomes complicated because the following works arise:

(1) The cloud service 200 issues in advance an individual unique key (which is not sure if it is used) for each application for tens of thousands of image forming apparatuses.

(2) Perform management to enable releasing applications with an individual unique key (issued in (1)) implemented therein for each individual image forming apparatuses.

(3) Release applications applicable to the individual of the purchased image forming apparatus when a user purchases an image forming apparatus.

In the present exemplary embodiment, the image forming apparatus 300 encrypts and stores an initial common key and an individual unique key for accessing the cloud service 200. Thus, security risk can be reduced. Further, an individual unique key is indispensable for the image forming apparatus 300 to obtain from the cloud service 200 an operation permit for performing an application function. Thus, security risk can be reduced.

In present exemplary embodiment, in a state where the access token obtaining application 904 for the operation permit obtaining is installed in the image forming apparatus 300, only the initial common key are stored in the image forming apparatus 300. In this state, a malicious application cannot access the cloud service 200. Further, when the image forming apparatus 300 performs the individual unique key obtaining processing, the individual unique key and the operation permit are stored in image forming apparatus 300. In this state, since an operation permit for the print application 906 has been issued, the print application 906 can access the cloud service 200. However, since an operation permit has not been issued for a malicious application, the malicious application cannot access the cloud service 200.

Other Embodiments

The present exemplary embodiment is also achieved by performing the following processing. Specifically, software (program) for achieving the functions of the above-described exemplary embodiments is supplied to a system or an apparatus via a network or various types of storage media, and then a computer (or CPU, a micro processing unit (MPU), etc.) of the system or the apparatus reads the program and then executes it.

According to the above-described exemplary embodiments, the image forming apparatus 300 encrypts and stores the initial common key and the individual unique key for accessing the cloud service 200. Thus, security risk can be reduced. Further, an individual unique key is indispensable for the image forming apparatus 300 to obtain from the cloud service 200 an operation permit for performing an application function. Thus, security risk can be reduced. Further, the image forming apparatus 300 deletes the initial common key at a timing when it becomes no longer necessary. Thus, security risk can be reduced.

Advantageous Effect

According to the above-described embodiments, security risk can be reduced.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2012-236954 filed Oct. 26, 2012, which is hereby incorporated by reference herein in its entirety.

What is claimed is:

1. An image forming apparatus using a service provided by a server apparatus that communicates with the image forming apparatus, the image forming apparatus comprising:

a memory; and a processor, the processor configured to:

obtain secret key information, for decrypting common authentication information, using an access token obtaining application which has an encrypted initial common key;

decrypt encrypted common authentication information usable by a plurality of image forming devices based on the secret key information for decrypting the common authentication information;

request encrypted individual authentication information of the image forming apparatus from the server apparatus by using the decrypted common authentication information and individual identification information for identifying the image forming apparatus, and to obtain the encrypted individual authentication information from the server apparatus; and request, based on individual authentication information obtained by decrypting the obtained encrypted individual authentication information and on service use information for using the service, use permission information of the service from the server apparatus, and to obtain the use permission information from the server apparatus.

2. The image forming apparatus according to claim 1, wherein the processor is further configured to, upon obtaining the encrypted individual authentication information, delete the encrypted common authentication information.

3. The image forming apparatus according to claim 1, wherein the encrypted individual authentication information is stored in a nonvolatile memory.

4. The image forming apparatus according to claim 1, wherein secret key information for decrypting the encrypted individual authentication information is further obtained from the server apparatus, and wherein the use permission information for the service is requested based on the individual authentication information decrypted based on the secret key information for decrypting the individual authentication information and on information for using the service.

5. The image forming apparatus according to claim 1, wherein the service use information includes identification information for identifying an application program for using the service and service authentication information for using the service, and wherein, based on the individual authentication information and the service use information, the use permission information of the service is requested for the server apparatus.

6. A control method performed by an image forming apparatus using a service provided by a server apparatus that communicates with the image forming apparatus, the method comprising:

obtaining secret key information, for decrypting common authentication information, using an access token obtaining application which has an encrypted initial common key;

decrypting encrypted common authentication information usable by a plurality of image forming devices based on the secret key information for decrypting the common authentication information;

requesting encrypted individual authentication information of the image forming apparatus from the server apparatus by using the decrypted common authentication information and individual identification information for identifying the image forming apparatus and then obtaining the encrypted individual authentication information from the server apparatus; and requesting, based on individual authentication information obtained by decrypting the obtained encrypted individual authentication information and on service use information for using the service use permission information of the service from the server apparatus, and then obtaining the use permission information from the server apparatus.

7. The control method according to claim 6, further comprising deleting, upon obtaining of the encrypted individual authentication information, the encrypted common authentication information.

8. The control method according to claim 6, wherein the encrypted individual authentication information is stored in a nonvolatile memory.

9. The control method according to claim 6, wherein secret key information for decrypting the encrypted individual authentication information is further obtained from the server apparatus, and wherein the use permission information for the service is requested based on the individual authentication information decrypted based on the secret key information for decrypting the individual authentication information and on information for using the service.

10. The control method according to claim 6, wherein the service use information includes identification information for identifying an application program for using the service and service authentication information for using the service, and wherein, based on the individual authentication information and the service use information, the use permission information of the service is requested for the server apparatus.

11. A non-transitory computer-readable storage medium storing computer-executable instructions to be executed by an image forming apparatus using a service provided by a server apparatus that communicates with the image forming apparatus, the computer-executable instructions being executed to perform the following processing:

obtaining secret key information, for decrypting common authentication information, using an access token obtaining application which has an encrypted initial common key;

decrypting encrypted common authentication information usable by a plurality of image forming devices based on the secret key information for decrypting the common authentication information;

requesting encrypted individual authentication information of the image forming apparatus from the server apparatus by using the decrypted common authentication information and individual identification information for identifying the image forming apparatus and then obtaining the encrypted individual authentication information from the server apparatus; and requesting, based on individual authentication information obtained by decrypting the obtained encrypted individual authentication information and on service use information for using the service, use permission information of the service from the server apparatus and then obtaining the use permission information from the server apparatus.

12. The non-transitory computer-readable storage medium according to claim 11, wherein the computer-executable instructions further comprise deleting the encrypted common authentication information upon obtaining of the encrypted individual authentication information.

13. The non-transitory computer-readable storage medium according to claim 11, wherein the encrypted individual authentication information is stored in a nonvolatile memory.

14. The non-transitory computer-readable storage medium according to claim 11, wherein secret key information for decrypting the encrypted individual authentication information is further obtained from the server apparatus, and wherein the use permission information for the service is requested based on the individual authentication information decrypted based on the secret key information for decrypting the individual authentication information and on information for using the service.

15. The non-transitory computer-readable storage medium according to claim 11, wherein the service use information includes identification information for identifying an application program for using the service, and service authentication information for using the service, and wherein, based on the individual authentication information and the service use information, the use permission information of the service is requested for the server apparatus.

* * * * *